United States Patent [19]

Bagby et al.

[11] 4,084,892
[45] Apr. 18, 1978

[54] FILM ADVANCEMENT CONTROL FOR MOTION PICTURE PROJECTOR

[75] Inventors: John P. Bagby, Lake Forest; Erwin E. Figge, Des Plaines; Raymond W. H. Kim, Skokie, all of Ill.

[73] Assignee: Bell & Howell Company, Chicago, Ill.

[21] Appl. No.: 769,987

[22] Filed: Feb. 18, 1977

[51] Int. Cl.² ............... G03B 31/02; G03B 21/48
[52] U.S. Cl. ............................. 352/29; 352/180; 352/194; 352/195
[58] Field of Search .............. 352/26, 27, 29, 30, 352/169, 174, 176, 177, 180, 191, 194, 195, 196

[56] References Cited

U.S. PATENT DOCUMENTS

| 3,672,751 | 6/1972 | Martin | 352/180 |
|---|---|---|---|
| 3,694,065 | 9/1972 | Roth | 352/195 |
| 3,702,730 | 11/1972 | Russell | 352/180 |

*Primary Examiner*—Russell E. Adams
*Attorney, Agent, or Firm*—John H. Moore; John E. Peele, Jr.

[57] ABSTRACT

A control for varying the speed of advancement of film is described for use in a film projector in which the film is advanced by a shuttle tooth which engages perforations in the film and advances the film along a path between a light source and a projector aperture. The control includes a rotary shutter assembly having one or more shutter blades for interrupting the light from the light source. As the shutter assembly rotates, the shuttle tooth is reciprocated in the direction of film feed by a rotary cam having one or more cam lobes mechanically coupled to the shuttle tooth. The rotation of the cam lobes is synchronized to the rotation of the shutter blades such that the shuttle tooth is positioned for engagement with the perforations associated with the next successive film frame to be projected whenever a shutter blade interrupts the light source. To engage the shuttle tooth with the film perforations, means are included for sensing the interruption of the light source by the shutter blades to generate a train of pulses, each equal in separation to 1/Nth number of light interruptions, (where N is selectable) and, in response to each pulse, means for advancing the shuttle tooth into engagement with the film perforations so that the film may be advanced by the next motion of the shuttle tooth in the direction of film feed. Thus, the film is engaged and advanced upon each reciprocation of the shuttle tooth when N equals one, and at a selectably slower rate when N is greater than one.

16 Claims, 12 Drawing Figures

PRIOR ART

PRIOR ART

FILM ADVANCEMENT CONTROL FOR MOTION PICTURE PROJECTOR

BACKGROUND OF THE INVENTION

This invention relates generally to motion picture projectors and particularly to a mechanism for controlling the rate of film advancement in such a projector.

Prior motion picture projectors have been proposed wherein the film is advanced between a light source and a projection aperture by means of a shuttle tooth which engages perforations in the film. The shuttle tooth is typically moveable in an in-out direction for engagement and disengagement with the film and moveable in the direction of film feed for advancing the film a frame at a time.

The reciprocation of the shuttle tooth in the direction of film feed is typically obtained by mechanically linking the shuttle tooth to a cam mounted on the shaft of the shutter assembly. For each revolution of the shaft, the shuttle tooth is moved up and down once (assuming the path of film feed is vertical).

A second cam, linked to the same shaft, moves the shuttle tooth horizontally into and out of engagement with the film in synchronism with the vertical reciprocation of the shuttle tooth. Thus, for each complete rotation of the shaft the shuttle tooth is moved vertically into alignment with the next film frame to be projected, horizontally into engagement with the film, downwardly to advance the film by one frame, and horizontally again out of engagement with the film.

In order to provide for different rates of film advancement, complicated arrangements of gears and cams have been used. Such arrangements have been expensive, noisier than desirable and subject to excessive wear, and limited in choice of speeds.

In prior projectors adapted to reproduce sound recorded on a magnetic strip disposed along a margin of the film, it has been difficult to synchronize the advancement of the tape past the projection aperture with the advancement of the film past a sound play-back head. Such synchronism is necessary to ensure that the reproduced sound follows the reproduced images. In the past, when the film was advanced past the projection aperture faster than the advancement of the film past the sound play-back head, the advancement of the film past the projection aperture was typically halted for a complete frame interval to allow the images to "catch-up" with the sound. This procedure may give rise to undesirable results. For example, when the projected image includes motion, the motion appears jerky as a result of inhibiting the advancement of the film for a full frame.

Accordingly, it is an object of this invention to provide a film advancement mechanism which overcomes the deficiencies noted above.

It is a more particular object of this invention to provide a film advancement mechanism capable of advancing the film at a variety of speeds without the complicated gear and cam arrangements found in prior projectors.

It is another object of this invention to provide a film advancement mechanism for sound movie projectors wherein the speed of advancement of the film past the light source is synchronized with the speed of advancement of the film past the sound play-back head without producing jerky images.

BRIEF DESCRIPTION OF THE FIGURES

These and other objects of the invention are more particularly set forth in the following detailed description and in the accompanying drawings of which.

DESCRIPTION OF THE PREFERRED EMBODIMENT

The invention described herein is a film advancement control for use in a film projector in which a shuttle tooth reciprocates in the direction of film feed at a constant speed for intermittently advancing the film between a light source and a projection aperture. While the shuttle tooth reciprocates in the direction of film feed, it is moved into and out of engagement with the film at a rate which may be slower than the rate of its reciprocation. Thus, while the shuttle tooth may be reciprocated at a rate corresponding to 54 frames per second, for example, the shuttle tooth may be caused to engage the film only on every third reciprocation so as to advance the film at a rate of 18 frames per second. By virtue of the way in which the rate of engagement of the shuttle tooth with the film is effected, the rate of film advancement is easily selected to be equal to the rate of reciprocation of the shuttle tooth or at a submultiple thereof. That is, for a rate of shuttle tooth reciprocation corresponding to 54 frames per second, the rate of film advancement may be easily selected to be 54 frames per second, 27 frames per second, 18 frames per second, etc. This variable rate of film advancement is achieved with the use of a less complicated gear and cam arrangement than heretofore known and a novel electrical control. Because of the way in which the rate of film advancement is effected herein, it is also possible to more effectively synchronize a projected image with its associated sound in a sound movie projector.

In movie projectors wherein the film is advanced by a reciprocating shuttle tooth, the motion of the shuttle tooth has been effected by virtue of a pair of cams rotating in synchronism with each other and in synchronism with the rotation of a three-bladed shutter assembly. A first cam, commonly referred to as the "up-down" cam, is typically mounted on the drive shaft of the shutter assembly and has a single cam lobe which drives a cam follower coupled to the shuttle tooth. As the up-down cam rotates, the shuttle tooth is reciprocated, i.e., moved up and down in the direction of film feed once for each revolution of the up-down cam. For silent or non-sound projection, the up-down cam usually rotates at 1080 RPM so that the shuttle tooth is reciprocated at a rate corresponding to 18 frames per second. For sound projection, the up-down cam is rotated at 1440 RPM to impart to the shuttle tooth 24 reciprocations per second.

The above-described reciprocation of the shuttle tooth is done in synchronism with an in-out motion of the shuttle tooth imparted thereto by a second cam, commonly referred to as the "in-out" cam. The in-out cam effects the engagement of the shuttle tooth with the film and its retraction therefrom in synchronism with the reciprocation of the shuttle tooth. For example, after the shuttle tooth has advanced the film by one frame, the in-out cam causes the shuttle tooth to be retracted from the film, after which the up-down cam moves the shuttle tooth upward in position to engage and advance the next successive frame. The in-out cam will then have rotated to a position where its cam lobe causes the shuttle to engage the film. Subsequently, the up-down cam rotates to a position where its cam lobe causes the shuttle tooth to urge the film downward by one frame. The cycle repeats to intermittently advance the film a frame at a time past the projection aperture.

The vertical motion imparted to the film by the shuttle tooth is caused to occur when a shutter blade interrupts the light source so that the movement of the film will not be observed. Because the shutter assembly includes three shutter blades, each of which make one revolution for each revolution of the up-down cam, the light from the light source will be interrupted at a rate of 54 times per second. This rate of interruption ensures that a viewer will be unable to detect flicker in the projected image.

Figure 1:
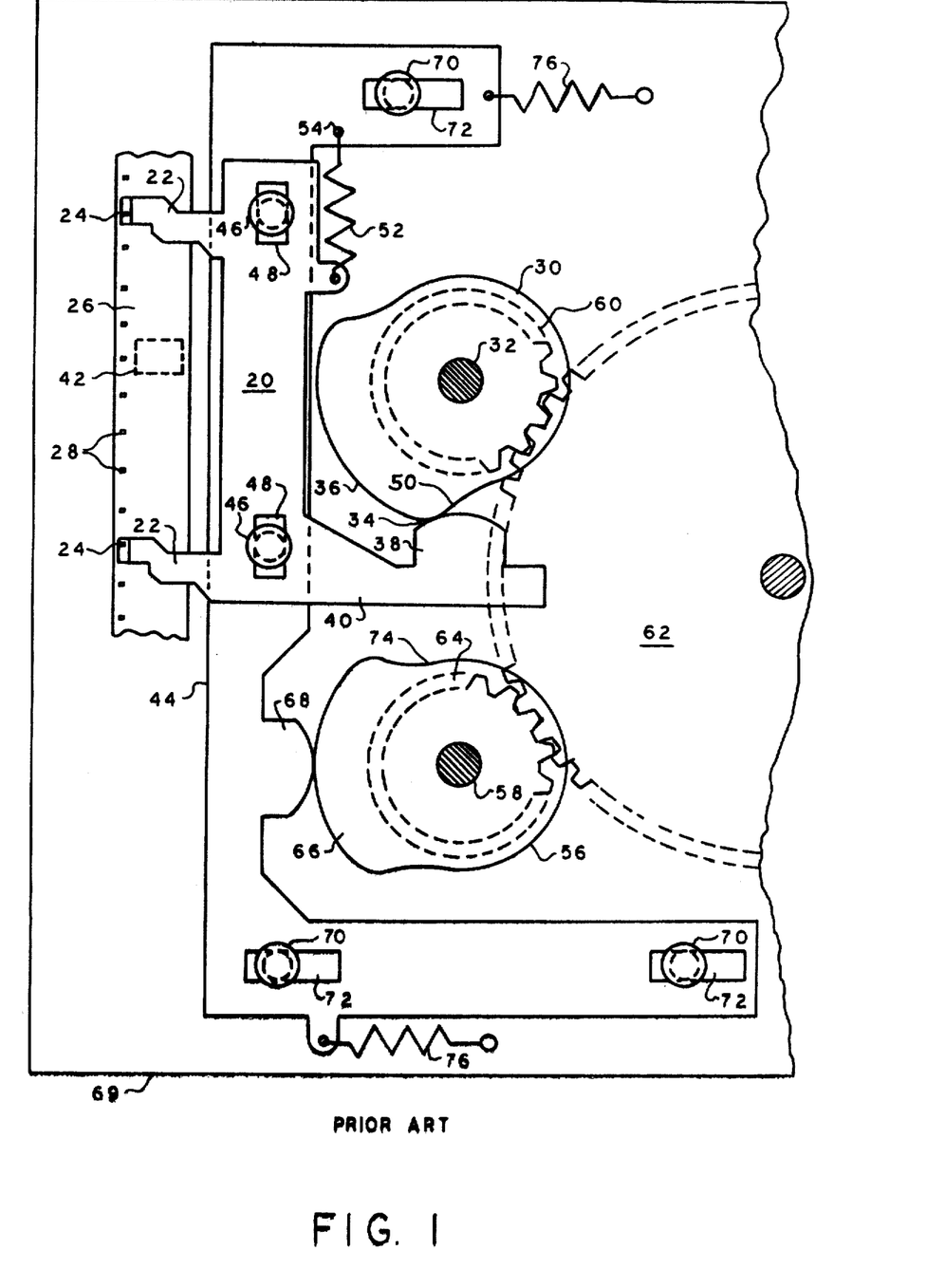
FIG. 1 schematically illustrates a shuttle tooth drive mechanism typical of the prior art with film rotated 90°.

Referring now to FIG. 1, there is shown schematically a shuttle tooth assembly and drive means for advancing the film, all of which is typical of the prior art. A shuttle 20, moveable in an up-down direction and an in-out direction (left to right in the Figure) has a pair of shuttle teeth 22 on which a corresponding pair of projections 24 are mounted. The film 26 has perforations 28 along one margin, the perforations 28 being spaced apart by the distance between film frames. The projections 24 are disposed to engage the perforations 28 in order to advance the film when the shuttle teeth 22 are moved downwardly.

The up-down reciprocation of the shuttle 20 and its teeth 22 is effected by an up-down cam 30 mounted for rotation on a shaft 32. As the cam 30 rotates, a surface 34 of a cam lobe 36 bears on and urges downwardly a cam follower 38. The downward motion of the cam follower 38 is imparted to the shuttle 20 by virtue of an arm 40 rigidly connecting the follower 38 to the shuttle 20. When the projections 24 are engaging the perforations 28 as shown, the film 26 is advanced past a projection aperture 42 by the downward motion of the shuttle 20.

The shuttle 20 is free to move vertically by virtue of being slideably connected to a support 44 which is not moveable vertically. To permit vertical motion of the shuttle 20, a pair of studs 46 which are mounted on the support 44 pass through a corresponding pair of elongated slots 48 in the shuttle 20.

As the up-down cam 30 rotates further, a surface 50 thereof will bear on the follower 38, thereby permitting the shuttle 20 to move vertically in response to the upward bias applied by a spring 52 which is connected at 54 to the support 44.

To move the shuttle teeth 22 into and out of engagement with the film 26, an in-out cam 56 is provided. The cam 56 is mounted for rotation on an idler shaft 58. The rotary motion of the shaft 58 and the cam 56 may be effected by a gear linkage between the drive shaft 32 and the idler shaft 58. An example of such a linkage is shown as comprising a gear 60 mounted on the drive shaft 32, a gear 62 driven by the gear 60 and a gear 64 mounted on the idler shaft 58. Thus, for each rotation of the gear 60, the gear 56 completes one rotation.

Integral with the in-out cam 56 is a cam lobe 66 which effects the engagement and disengagement of the shuttle teeth 22 with the film 26. The lobe 66 is disposed to bear on a cam follower 68 for moving it, and the support 44 to which it is attached, to the left in FIG. 1 when the shuttle 20 is in its top-most position. Because the shuttle 20 is not adapted to move horizontally with respect to the support 44 by virtue of its connection thereto by the studs 46, the shuttle 20 follows the horizontal motion of the support 44.

The support 44 is adapted for horizontal motion by virtue of its connection to a support plate 68. This connection may be obtained by means of studs 70 which are attached to the support plate 69 and which pass through three corresponding, horizontally elongated slots 72 in the support 44. Accordingly, while the support plate 69 remains in a fixed position, the support 44 moves horizontally and carries with it the shuttle 20.

When the shuttle 20 reaches its bottom-most position after having advanced the film 26 downwardly by one frame, the in-out cam 56 will have rotated so that its surface area 74 is adjacent the follower 68. As a result, the support 44 will be urged to the right by virtue of springs 76 which couple the support 44 to the support plate 69. Such motion will retract the shuttle teeth 22 from engagement with the film 26.

Thereafter, the surface 50 of the up-down cam 30 will be adjacent the follower 38 to permit the shuttle 20 to be drawn upwardly by the spring 52 to position the shuttle teeth 22 for engagement with the next successive film frame. Continued rotation of the cams 30 and 56 results in the film 26 being intermittently advanced, a frame at a time, into alignment with the projection aperture 42.

The conventional film advancement mechanism described above with reference to FIG. 1 has been somewhat schematically shown. An alternate mechanism is described in detail in a prior U.S. application Ser. No. 609,851, filed Sept. 2, 1975 and includes additional structure for effecting reverse advancement of the film and multiple speed advancement. The teachings of said prior application with respect to the way in which a shuttle tooth may be supported for horizontal and vertical motion are incorporated herein by reference.

Figures 2, 3, 4:
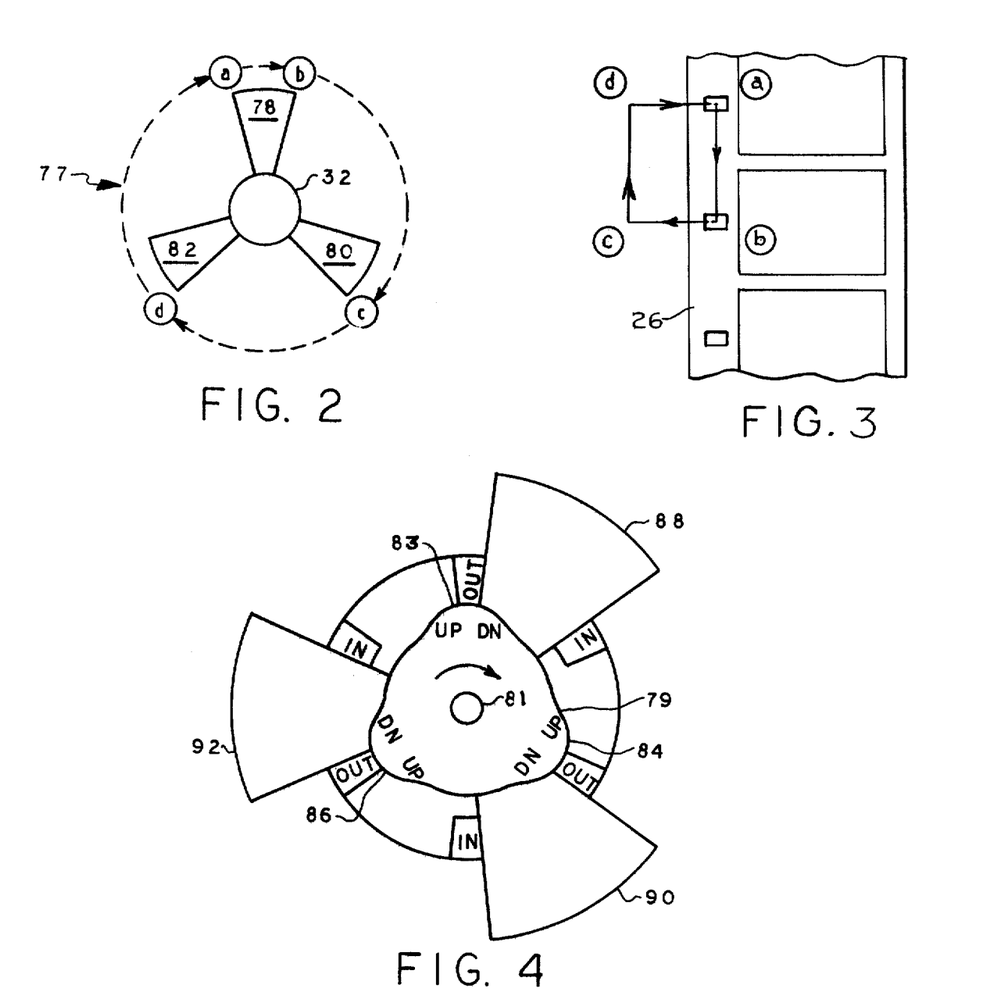
FIG. 2 illustrates a shutter blade assembly for use with the drive mechanism of FIG. 1.
FIG. 3 illustrates the path followed by a shuttle tooth in advancing the film.
FIG. 4 illustrates a shutter assembly and a cam used in an embodiment of the invention.

Conventionally, three shutter blades are mounted on the drive shaft 32 for interrupting light from a light source (not shown). FIG. 2 illustrates the usual shutter blade configuration and FIG. 3 illustrates the sequence of film advancement motions and their relationship to the shutter blades. As shown in FIG. 2, a shutter assembly 77 includes the drive shaft 32 and three equally angularly spaced shutter blades 78, 80 and 82 mounted about the shaft 32. The cams 30 and 56 (FIG. 1) and their respective cam lobes are positioned so that the shuttle teeth 22 advance the film 26 from position *a* to position *b* (FIG. 3) when the shutter blade 78 is in the position indicated. It is assumed that when a shutter blade is in the position shown for blade 78, it is interrupting the light from the light source.

While the blade 78 is advancing from position *b* to position *c* in FIG. 2, the shuttle teeth are retracted from the film 26 and follow the path *b–c* in FIG. 3. At this point, blade 82 is interrupting the light source.

As blade 78 moves from position *c* to position *d* in FIG. 2, the shuttle teeth follow the path *c–d* in FIG. 3 and blade 80 interrupts the light source. The movement of blade 78 from position *d* to position *a* coincides with the advancement of the shuttle teeth along path *d–a*. Blade 78 will then move from *a* to *b*, thus interrupting the light source again, and the shuttle teeth will advance along the path *a–b* to move the next film frame into alignment with the projection aperture.

One problem which arises with prior projectors which rely solely on mechanical structures for advancing the film is the complexity of the gear and cam arrangements which are required for multispeed film advancement. Such complex mechanical arrangements tend to be expensive and impose rather strict alignment tolerances. An advantage of the present invention is that it provides for multispeed film advancement with an electrical network operating in conjunction with a relatively simple mechanical structure which may be similar to that shown in FIG. 1.

A film advancement control in accordance with the present invention preferably, but not necessarily, employs an up-down cam having a plurality of cam lobes. The shutter assembly includes a plurality of shutter blades equal in number to the number of cam lobes on the up-down cam. An example of such a structure is shown in FIG. 4 wherein an up-down cam 79 is mounted for rotation on a shaft 81. Three cam lobes 83, 84 and 86 are disposed on the cam 79 at equally angularly spaced intervals for reciprocating a shuttle tooth in the direction of film feed once for each revolution of a cam lobe. Thus, if cam 79 rotates at 1080 RPM as is customary in silent movie projectors, the shuttle tooth will be reciprocated by cam lobes 83, 84 and 86 at a rate corresponding to 54 frames per second.

Also mounted about the shaft 81 are three equally angularly spaced shutter blades 88, 90 and 92. The shutter blades are positioned with respect to the cam lobes 83, 84 and 86 such that the shuttle tooth is positioned for engagement with the perforations associated with the next successive film frame to be projected whenever a shutter blade interrupts the light source. This concept is most easily explainable in terms of the notations "in," "out," "up" and "down" associated with the cam 79. As shown in FIG. 4, the cam lobe 83 and the remaining cam lobes have the notations "up" and "down" adjacent the surfaces of the lobes which cause the up and down motion of the shuttle tooth. On opposite sides of the shutter blade 88 appear the notations "in" and "out" to indicate that, at the indicated position of the shutter blade 88, the shuttle is to be engaged or disengaged, respectively, from the film. For example, just prior to the shutter blade 88 interrupting the light source, the shuttle tooth should be engaged with the perforations of the next frame to be projected (assuming the shaft 81 rotates clockwise). The shutter blade 88 then interrupts the light source and the surface of the lobe 83 adjacent the "down" notation drives the shuttle tooth downwardly to place the engaged frame of the film in alignment with the projection aperture. The shutter blade 88 then moves out of interruption of the light source to permit the aligned frame to be projected and the shuttle tooth is disengaged from or moved "out" of the film. The surface of the lobe 83 adjacent the notation "up" then causes the shuttle tooth to move upwardly toward the next successive film frame.

The sequence just described corresponds to the steps indicated in FIG. 3 wherein the shuttle tooth advances along the path *d–a* at each "in" notation of FIG. 4, along the path *a–b* at each "down" notation, along the path *b–c* for each "out" notation, and along the path *c–d* for each "up" notation. While the cam 79 causes the shuttle tooth to be advanced along the paths *c–d* and *a–b* three times for each rotation of the shaft 81, an in-out cam may be synchronized to the rotation of the cam 79 for advancing the shuttle tooth along the paths *d–a* and *b–c* at the appropriate times. Such synchronization will place the shuttle tooth in the "up" position for engagement with the perforations in the next successive film frame whenever a shutter blade interrupts the light source. For example, the surface of lobe 84 adjacent the "up" notation will advance the shuttle tooth along the path *c–d* (FIG. 3). The shuttle tooth will remain "up" when the shutter blade 88 first interrupts the light source and while an "in-out" cam or other mechanism advances the shuttle tooth along the path *d–a*.

As described above, the cam 79 reciprocates a shuttle tooth in the direction of film feed three times for each rotation of the shaft 81. This rate of advancement corresponds to the maximum rate of film advance so that if the shaft 81 rotates at 1080 RPM, the shuttle tooth will advance along the paths *a–b* and *c–d* at a rate corresponding to 54 frames per second. If an in-out cam or other mechanism advances the shuttle tooth into engagement with the film perforations each time the shuttle tooth reaches position *d*, the film will be advanced at a rate of 54 frames per second. However, the embodiment described herein permits the shuttle tooth to engage the film perforations each time the shuttle tooth reaches position *d* or to engage the film perforations every second, third, fourth, etc. time the shuttle tooth reaches position *d*. Thus, if the shuttle tooth is advanced into engagement with the film perforations every other time the shuttle tooth reaches position *d*, the film will be advanced at 27 frames per second even though the shuttle tooth is reciprocated in the direction of film feed (up and down) at a rate corresponding to 54 frames per second. The structure now to be described operates in conjunction with the cam and shutter assembly shown in FIG. 4 to advance the film at a maximum rate determined by the cam and shutter assembly of FIG. 4, 54 frames per second, for example, or at rates which are sub-multiples of the maximum rate.

Figure 6:
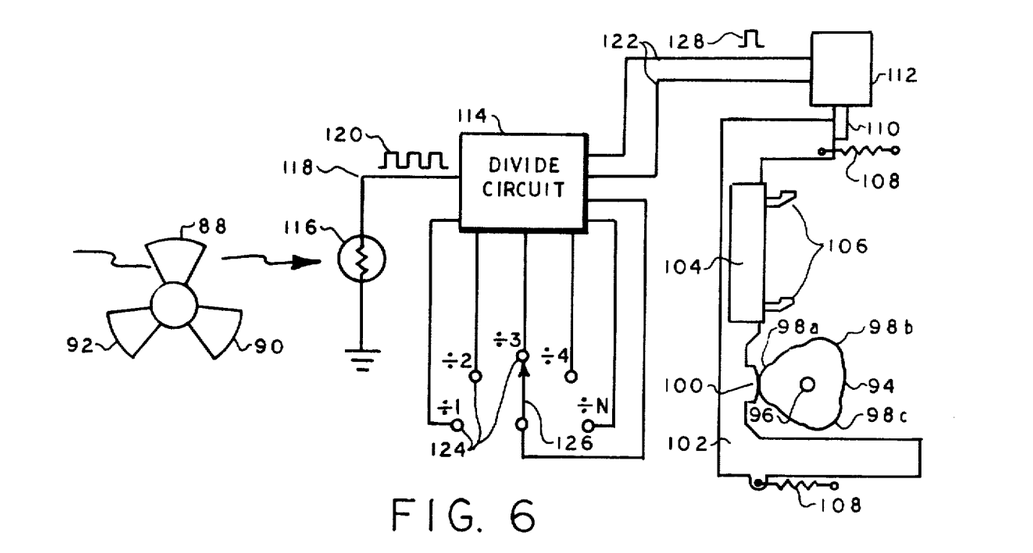
FIG. 6 schematically illustrates a multispeed film advancement control in accordance with the invention.

Turning now to FIG. 6, there is shown a mechanism for advancing the shuttle tooth into engagement with perforations in the film at a rate equal to the up-down rate of reciprocation of the shuttle tooth and at submultiple rates. The illustrated mechanism includes an in-out cam 94 rotatable about a shaft 96. The cam 94 includes cam lobes 98*a*, 98*b* and 98*c* and rotates in synchronism with an up-down cam such as cam 79 of FIG. 4. As the cam lobe 98*a* rotates, it bears upon a cam follower 100 for urging a moveable support 102 and a shuttle 104 to the left in the figure. The shuttle 104 has a pair of shuttle teeth 106 which extend in the direction of the film. In this embodiment, the film is disposed to the right of the shuttle 104 rather than to the left as in FIG. 1. Accordingly, the FIG. 6 structure is designed so that the raised portions of the cam lobes 98 urge the shuttle teeth out of engagement with the film and a pair of springs 108 pull the shuttle teeth 106 into engagement with the film when the raised portions of lobes 98 rotate out of contact with the follower 100.

The way in which the support 102 and the shuttle 104 are movably mounted may be as shown in FIG. 1. In addition, the vertical reciprocation of the shuttle 104 may be effected by the structure of FIG. 1 wherein cam 79 (FIG. 4) is substituted for cam 30 (FIG. 1). To synchronize the rotation of the cam 94 with the rotation of the up-down cam 79 (FIG. 4), the shaft 96 may be driven at the same speed as shaft 81 by a gear linkage as shown in FIG. 1.

To selectively inhibit the shuttle teeth 106 from being pulled into engagement with the film when the shuttle teeth 106 are at their top-most position (position d in FIG. 3), a solenoid plunger 110 is disposed in the path of horizontal movement of the support 102. Accordingly, when the plunger is extended as shown, the support 102 and the shuttle teeth 106 are inhibited from engaging the film. Accordingly, when the plunger 110 is so extended, the shuttle teeth may be urged to the left by cam 94 and may be reciprocated vertically, but they are inhibited from being pulled by springs 108 into engagement with the film. The next frame of film will not be engaged and moved into alignment with the projection aperture until plunger 110 is retracted by its solenoid 112.

To selectively actuate the solenoid 112 to retract the plunger 110 and permit the next frame of film to be engaged and advanced, a divide circuit 114 and a photocell 116 operate together to generate a train of solenoid-actuating pulses. The photocell 116 is disposed to receive light from the light source (not shown) which has been interrupted by the shutter blades 88, 90 and 92, all of which blades are preferably mounted on the shaft 81 with the cam 79 as shown in FIG. 4.

Figure 5:
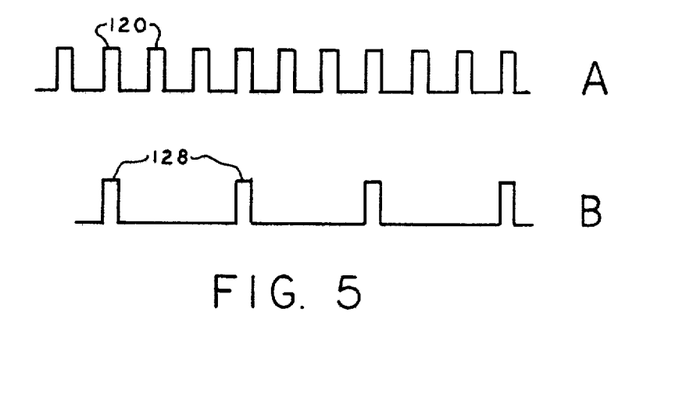
FIG. 5 illustrates waveforms useful in describing the operation of an embodiment of the invention.

As the photocell 116 detects each interruption of light, it generates at its output lead 118 a single pulse 120 as shown in FIG. 5a. Thus, a train of pulses 120 is generated equal in number to the number of interruptions of light by the shutter blades.

The divide circuit 114 receives the pulses 120 via lead 118 and generates at its output leads 122 a second train of pulses for energizing the solenoid 112.

To determine the pulse rate in the second train of pulses at leads 122, the divide circuit 114 has a plurality of pulse rate select contacts 124 which may be individually selected by a switch 126. The notations adjacent the contacts 124 indicate the number of pulses 120 which must be received by the divide circuit 114 in order to generate a single pulse output at the leads 122, e.g., 1, 2, 3, 4, and N where N is an integer greater than one. When the switch 126 is in the position shown, the divide circuit 114 will divide the number of received pulses 120 by three and generate at its output leads 122 a single output pulse 128 for every third input pulse 120, as shown in FIG. 5b.

Upon receipt of a pulse 128, the solenoid 112 will be energized and retract its plunger 110 to permit the shuttle teeth 106 to move to the right in FIG. 6 and engage the film when the cam 94 has rotated to a position which permits such movement. The next downward movement of the shuttle teeth 106 will then advance the engaged film into alignment with the projection aperture.

Because the shuttle teeth 106 are reciprocating in the direction of film feed (up and down in FIG. 6) once for each revolution of the up-down cam lobes 83, 84 and 86 (FIG. 4) and because the number of up-down cam lobes is equal to the number of shutter blades, the shuttle teeth are reciprocated up and down at a rate equal to the rate of pulses 120. However, when the switch 126 is in the position shown, the shuttle teeth 106 will engage and advance the film only on every third vertical reciprocation. In like manner, when the switch 126 is in contact with the divide-by-two contact 124, the shuttle teeth 106 will be permitted to engage the film on every second reciprocation. When the switch 126 is in contact with the divide-by-one contact, the shuttle teeth 106 are permitted to engage the film and advance it at the maximum rate, once for each vertical reciprocation. For example, when rotating the up-down cam 79 at 1080 RPM, the shuttle teeth 106 will be reciprocated at a rate corresponding to 54 frames per second. By selecting among the various contacts 124, the film may be advanced at rates corresponding to 54, 27, 18, etc., frames per second.

In practicing this invention, it is not critical how the shuttle teeth are physically engaged and disengaged from the film. In FIG. 6, this has been accomplished by the use of cam 94 and springs 108. It is also not critical that a solenoid-actuated plunger be used to inhibit the engagement of the shuttle teeth with the film, but the mechanism shown in FIG. 6 is preferred because of its easy adaptation for use with present projectors such as shown in FIG. 1.

Figure 7:
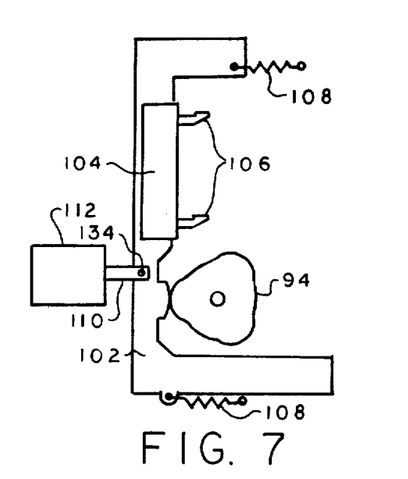
FIG. 7 illustrates an alternate embodiment of a portion of the structure shown in FIG. 6.

FIG. 7 illustrates an alternate position for a solenoid and plunger to inhibit the horizontal motion of the shuttle teeth. As shown, the plunger 110 is connected to the support 102 at 134 and the plunger 110 is adapted to follow the in-out motion of the support 102 when the solenoid 112 is de-energized. When the solenoid is energized by a pulse, the plunger 110 is held from motion to the right in FIG. 7 and inhibits the support 102 and the shuttle teeth 106 from moving to the right to engage the film. In this instance, the solenoid 112 is energized to inhibit the motion of shuttle teeth 106 whereas in FIG. 6 the solenoid was energized to permit such motion. Accordingly, when the arrangement shown in FIG. 7 is used, the pulses received by the solenoid 112 should be inverted so that solenoid 112 will be de-energized by every pulse from the divide circuit 114. In other respects, the operation of the structure shown in FIGS. 6 and 7 is similar.

Figure 8:
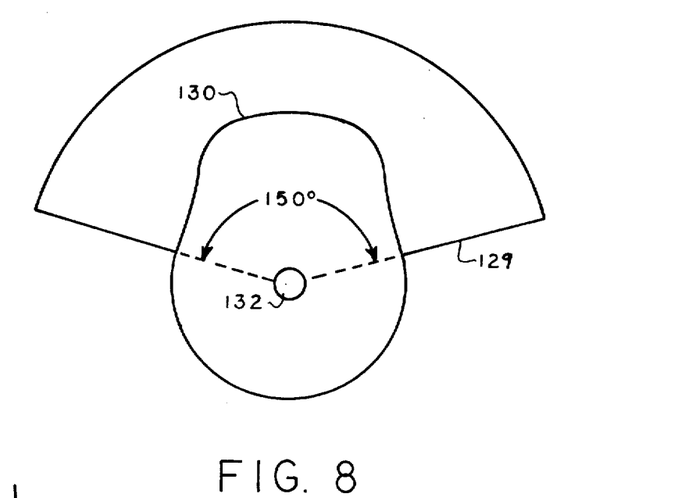
FIG. 8 schematically illustrates an alternate shutter and cam assembly for an embodiment of the invention.

The benefits of this invention may also be realized with a cam and shutter arrangement having more or less lobes and shutter blades than the preferred arrangement of FIG. 4. For example, a cam and shutter arrangement as shown in FIG. 8 may be used wherein a single shutter blade 129 and a single up-down cam lobe 130 are rotated about a common axis 132. However, to achieve a rate of film advancement equal to that obtained by the structure of FIG. 4, the shutter blade 129 and the cam lobe 130 must be rotated three times faster. In addition, the shutter blade 129 should encompass an angle three times as great as the angle encompassed by each shutter blade of FIG. 4. Preferably, the shutter blade 129 encompasses an angle of 150°.

Alternately, the shutter and up-down cam assembly may include a pair of shutter blades and a corresponding pair of up-down cam lobes. Such an assembly would preferably rotate at one and one-half the speed of rotation of the FIG. 4 assembly and the shutter blades should be enlarged correspondingly to encompass a greater angle.

The embodiment described with reference to FIGS. 4 and 6 provides a variable speed film advancement control which eliminates the need for more complicated gear and cam arrangements for effecting multispeed film advancement. It is also extremely versatile in that the desired speeds of film advancement may be conveniently and easily changed by changing the divide circuit 114 to divide by different numbers.

Figure 9:
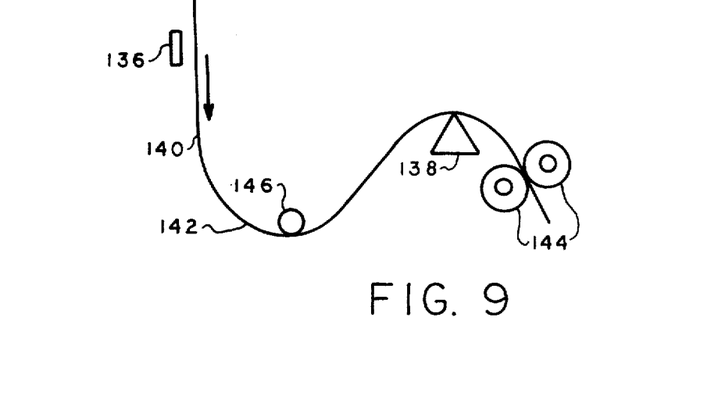
FIG. 9 schematically illustrates the path followed by film in a sound movie projector.

Up to this point, a film advancement control has been described which can be used in either sound or silent movie projectors and multispeed film advancement is achieved without the use of complicated cam and gear arrangements. When used in sound movie projectors, the invention becomes even more advantageous in that it may be used to more effectively control the synchronism between the projected image and the associated sound. An example of such use is in a sound movie projector wherein the film is advanced between the projection aperture and a sound play-back head, the film forming a loop, as shown in FIG. 9, between the projection aperture 136 and a sound play-back head 138. The film 140 is intermittently advanced past the aperture 136 and continuously advanced at a constant speed past the head 138. To absorb the intermittent motion of the film 140, a loop 142 of film is disposed between the aperture 136 and the head 138. A pair of rollers 144 may capture the film 140 and advance it at a constant speed.

In order to maintain synchronism between the image projected through the aperture 136 and the sound reproduced by the head 138, the size of the loop 142 must be constant. Conventionally, the loop 142 is of a size which separates the film at aperture 136 from the film at head 138 by 18 frames, the so-called sound-sync distance.

When the film is advanced past the aperture 136 at a speed other than the speed of the film past head 138, the loop 142 will either grow larger or smaller, depending on the difference between the two speeds. To detect an incorrect loop size, a movable sensor 146 may be positioned to rest on the loop 142. Thus, as the size of the loop changes, the sensor follows it to generate an indication of the size of the loop. A similar arrangement for detecting loop size is shown, for example, in U.S. Pat. No. 2,371,836.

Conventionally, the sensor 146 is connected to one or more switches such that, when the sensor 146 moves beyond a predetermined limit, the switches are closed to advance or retard the film by one film frame to adjust the size of the loop. When such advancement or retardation of the film occurs, it has usually taken place within the time span normally allocated for the projection of a frame. As a result, if the projected image includes continuous or continuing motion, the image may appear to be jerky while the size of the loop is being adjusted. According to this invention, however, the adjustment of the loop size can conveniently be made to occur in a fraction of one frame time and is, therefore, much less noticeable.

Figure 10:
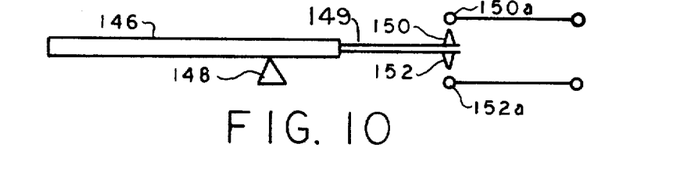
FIG. 10 illustrates an exemplary film loop size sensor for use in an embodiment of this invention.

Referring now to FIG. 10, there is shown the sensor 146 which detects loop size. The sensor 146 may be pivoted as on pivoting member 148 for moving a pair of contacts 150 and 152 into engagement with a corresponding pair of non-movable contacts 150a and 152a. When the size of the loop 142 grows too large, the sensor 146 pivots about member 148 to close the contacts 150 and 150a to actuate a circuit to be described for temporarily slowing the advancement of the film past the projection aperture. When the loop 142 decreases in size, the sensor 146 pivots so as to close the contacts 152 and 152a for temporarily speeding up the advancement of the film past the projection aperture.

Figure 11:
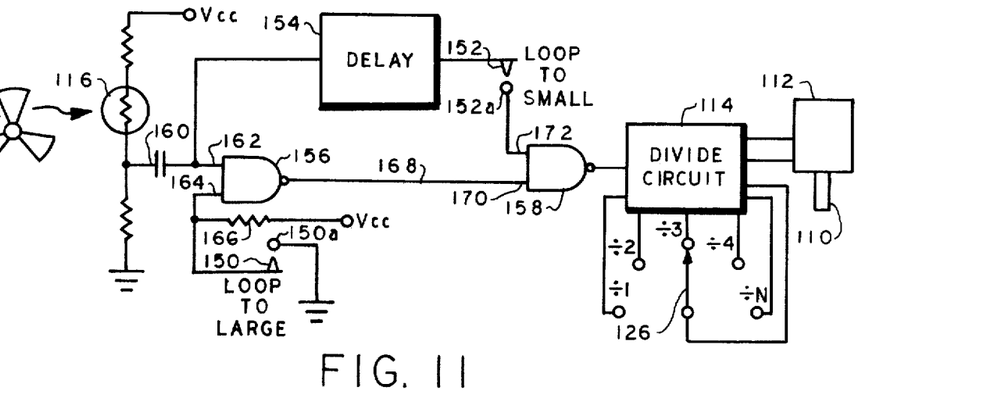
FIG. 11 schematically illustrates a combined multispeed film advancement control and a film loop size control in accordance with the invention.

FIG. 11 illustrates an exemplary circuit for effecting the speed-up and slow-down of the film in response to the closure of contacts 150–150a and 152–152a. As shown, the previous circuitry, including the photocell 116, the divide circuit 114 and the solenoid 112 may be easily interconnected with a delay network 154 and a pair of Nand gates 156 and 158 to achieve both the multispeed film advancement described above and the loop size control. In operation, when the loop size is correct, the circuitry performs as described above for achieving multispeed control. Specifically, the pulses generated by the photocell 116 are coupled via a capacitor 160 to an input 162 of the Nand gate 156. Another input 164 is coupled to a supply voltage Vcc via a resistor 166. The input 164 is also coupled to the contact 150 for grounding thereof through contact 150a when the loop is too large.

With contact 150 ungrounded, both inputs to the Nand gate 156 are at a high logic level when a pulse is received at input 162, thereby generating a similar but inverted pulse at output lead 168. The pulses are coupled via lead 168 to an input 170 of the Nand gate 158 whose other input 172 normally receives no signal. The output of the Nand gate 158 is as shown in FIG. 12A when the loop is of normal size.

Figure 12:
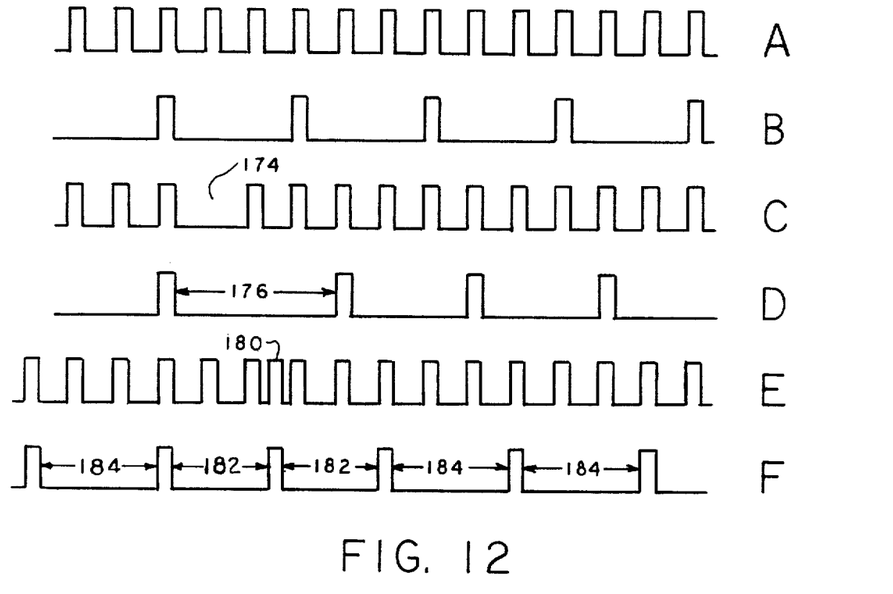
FIG. 12 illustrates waveforms useful in describing the operation of the structure shown in FIG. 11.

When the switch 126 selects the divide-by-three mode of operation for the divide circuit 114, the output of the divide circuit 114 is as shown in FIG. 12B and includes pulses which occur at a rate of 24 times per second, the normal film speed for movie projectors, when the pulses of FIG. 12A occur at a rate of 72 times per second.

When the film loop grows too large, the contacts 150 and 150a close, the input 164 to Nand gate 156 becomes grounded and the pulse trains appearing on lead 168 and at the output of Nand gate 158 will lack the pulse generated by the photocell 116 while contacts 150 and 150a are closed. FIG. 12C illustrates the space 174 where a pulse was deleted. As a result of the deleted pulse, the output of the divide network 114 appears as shown in FIG. 12D, the interval 176 being larger by one third than the remaining intervals. As a result, the solenoid will be energized to permit engagement of the film after an interval which is longer by one third than the normal interval between frames to restore the film loop to its normal size. As a result of decreasing the interval between two film frames by only one third of the normal interval rather than by a full interval as is usually the case, very little image continuity is perceived in the projected image while the loop size is being adjusted. Corresponding improvements in image continuity are achieved when the switch 126 selects any mode other than the divide-by-one mode for the divide circuit 114. Of course, when the divide-by-one mode is selected, the film will be advanced at a speed of 72 frames per second so that a full additional interval between two successive frames will not be as objectionable as a full additional interval between frames when the film is being advanced at a slower rate.

When the loop size decreases by an appropriate portion of a frame, the contacts 152 and 152a will close to couple to the input 172 of Nand gate 158 an additional pulse from the photocell 116. The additional pulse is delayed by the delay network 154 by an interval which preferably positions the additional pulse midway between the pulses received at input 170. FIG. 12E illustrates the output of Nand gate 158 when the contacts 152 and 152a are closed to permit passage of an additional pulse 180 to the input 172.

The additional pulse 180 will be counted by the divide circuit 114 so that it will reach a count of three and generate an output in which certain successive pulses will be separated by an interval which is one third smaller than normal. In FIG. 12E, the interval 182 is smaller by one third than the intervals 184. As a result, the solenoid will be activated sooner than normal by a factor of one third to permit the next successive frame to be advanced, thereby increasing the size of the loop to its normal size without introducing appreciable flicker to the projected image.

The last described aspect of this invention, the loop size control, is preferably used in sound movie projectors in connection with the multispeed film advancement control described earlier. However, both aspects of this invention may be used separately and independently. In addition, specific exemplary mechanical devices and electrical networks have been illustrated for practicing the invention. Many functionally equivalent components will serve the same purpose. For example, the pulses generated by the photocell 116 may also be generated by a Hall device or similar devices which may sense a magnetic coating on the film. Additionally, the up-down cam has been illustrated as being on the same shaft as the shutter blades. Equivalent results may be obtained by driving the shutter blades and the up-down cam separately but in synchronism. The functions of the plunger and the in-out cam may also be performed by functionally equivalent components. Many other modifications or alterations to the illustrated structure will be obvious to one skilled in the art in light of this disclosure. Accordingly, it is intended to embrace all such alterations and modifications which are included within the spirit and scope of this invention as defined by the appended claims.

What is claimed is:

1. In a film projector having a shuttle tooth moveable into and out of engagement with perforations in the film and adapted to be reciprocated in the direction of film feed for intermittently advancing the engaged film along a path between a light source and a projection aperture, a control for varying the speed of film advancement, comprising;

a rotary shutter assembly having at least one shutter blade for interrupting the light from the light source;

a rotary cam having a number of cam lobes equal to the number of shutter blades, said cam lobes being mechanically coupled to the shuttle tooth for reciprocating the shuttle tooth in the direction of film feed once for each revolution of a cam lobe, the rotation of each of said cam lobes being synchronized to the rotation of the corresponding shutter blade such that the shuttle tooth is positioned for engagement with the perforations associated with the next successive film frame to be projected whenever a shutter blade interrupts the light source;

means responsive to the interruption of the light by each shutter blade for generating a train of electrical pulses equal in number to 1/Nth the number of light source interruptions, where N is an integer;

means responsive to each pulse for advancing the shuttle tooth into engagement with the perforations in the film upon receipt of each pulse in the train of pulses, whereby the shuttle tooth is reciprocated in the direction of film feed once for each revolution of a cam lobe but the film perforations are engaged by the shuttle tooth only on every Nth shuttle tooth reciprocation so that the rate of film advance can be selectably varied by varying the value of N.

2. A control as set forth in claim 1 wherein said shuttle tooth advancement means includes a rotary in-out cam for advancing the shuttle tooth into engagement with the perforations in the film and for retracting the shuttle tooth from such engagement once for each reciprocation of the shuttle tooth, and an electrical circuit receiving the train of pulses for inhibiting the advancement of the shuttle tooth into engagement with the perforations in the film except on receipt of a pulse in the train of pulses, whereby when N is equal to one, the in-out cam advances the shuttle into engagement with the film so that the film may be advanced upon each reciprocation of the shuttle tooth and, when N is greater than one, the in-out cam advances the shuttle tooth into engagement with the film so that the film may be advanced upon every Nth reciprocation of the shuttle tooth.

3. A control as set forth in claim 2 wherein said electrical circuit includes a solenoid activated by each pulse in said train of pulses, said solenoid having a plunger disposed in relationship to said shuttle tooth for inhibiting engagement of said shuttle tooth with the film when the said solenoid is not actuated and for permitting such engagement when said solenoid is actuated.

4. A control as set forth in claim 1 wherein said means for generating a train of electrical pulses includes means for generating a first train of electrical pulses equal in number to the number of interruptions of the light source and means for dividing the first train of pulses by an integer N to obtain a second train of pulses, and wherein said shuttle tooth advancement means is responsive to the second train of pulses.

5. A control as set forth in claim 4 wherein said means for generating a first train of electrical pulses includes a photocell disposed to receive the interrupted light from the light source.

6. A control as set forth in claim 1 wherein said shutter assembly includes a single shutter blade.

7. A control as set forth in claim 1 wherein said shutter assembly includes three equally angularly spaced shutter blades and said rotary cam has three equally angularly spaced cam lobes.

8. A control as set forth in claim 4 for use in a sound movie projector in which the film is intermittently advanced past the projection aperture and continuously advanced at a constant speed past a sound play-back head, said film advance control including means for deleting at least one pulse from the first train of pulses when the intermittent speed of advance of the film past the light source is greater than the speed of advance of the film past the sound play-back head, whereby when the integer N is greater than one, the deletion of a pulse from the first train of pulses results in the shuttle tooth being temporarily inhibited from engaging and advancing the film for a duration equal to 1/Nth of the normal duration between successive film advancements so that the speed of advancement of the film past the projection aperture is equalized to the speed of advancement of the film past the sound pick-up head without imparting a jerky motion to a reproduced image.

9. A control as set forth in claim 4 for use in a sound movie projector in which the film is intermittently advanced past the projection aperture and continuously advanced at a constant speed past a sound play-back head, said control including means for adding a pulse between adjacent pulses in the first train of pulses when the intermittent speed of advance of the film past the light source is slower than the speed of advance of the film past the sound pick-up head, whereby when the integer N is greater than one, the addition of a pulse to the first train of pulses results in the shuttle tooth being temporarily advanced into engagement with the film for advancement thereof sooner by an interval equal to 1/Nth of the normal interval between successive film advancements so that the speed of advancement of the film past the projection aperture is equalized to the speed of advancement of the film past the sound pick-up head without imparting a jerky motion to a reproduced image.

10. A control as set forth in claim 8 wherein the film is disposed in a loop between the projection aperture and the sound play-back head and wherein a loop size sensor is disposed adjacent the looped film for activating said pulse deleting means when the film loop exceeds a predetermined size.

11. A control as set forth in claim 9 wherein the film is disposed in a loop between the projection aperture and the sound play-back head and wherein a loop size sensor is disposed adjacent the looped film for activating said pulse adding means when the film loop is smaller than a predetermined size.

12. In a film projector having a shuttle tooth moveable into and out of engagement with perforations in the film and adapted to be reciprocated in the direction of film feed for intermittently advancing the engaged film along a path between a light source and a projection aperture, a control for varying the speed of advancement of the film, comprising;
 a rotary shutter assembly having three equally angularly spaced shutter blades for interrupting the light from the light source;
 a first rotary cam rotatable in synchronism with the rotation of the shutter assembly and having three equally angularly spaced cam lobes mechanically coupled to the shuttle tooth for reciprocating the shuttle tooth in the direction of film feed once for each revolution of a cam lobe;
 a second rotary cam having one or more cam lobes mechanically coupled to the shuttle tooth for advancing the shuttle tooth into engagement with the film perforations and for retracting the shuttle tooth from such engagement once for each reciprocation of the shuttle tooth;
 means for detecting the interruption of the light source by the shutter blades and for generating a first train of electrical pulses equal in number to the number of interruptions of the light source;
 means responsive to the first train of pulses for generating a second train of pulses equal in number to 1/Nth the number of pulses in the first train, where N is a selectable integer;
 means responsive to the second train of pulses for inhibiting the advancement of the shuttle tooth into engagement with the film perforations except on receipt of a pulse in the second train of pulses,
 whereby the shuttle tooth is reciprocated in the direction of film feed once for each revolution of a cam lobe on said first rotary cam and the film is advanced by engagement of the shuttle tooth with the film perforations upon the occurrence of each pulse in the second train of pulses so that the rate of film advancement can be varied by selecting different values for N.

13. A control as set forth in claim 12 for use in a sound film projector in which the film is intermittently advanced past the projection aperture and continuously advanced at a constant speed past a sound play-back head and in which the film is looped between the projection aperture and the sound play-back head, further including;
 a loop size sensor disposed adjacent the film loop for sensing the size of the loop, said sensor generating a first signal when the film loop is larger than a predetermined size and generating a second signal when the film loop is smaller than the predetermined size;
 means responsive to the first signal for deleting a pulse from the first train of pulses; and
 means responsive to the second signal for adding a pulse to the first train of pulses,
 whereby the deletion of pulses from the first train of pulses results in the shuttle tooth being temporarily inhibited from engaging and advancing the film for a duration equal to 1/Nth of the normal duration between successive film advancements and the addition of a pulse to the first train of pulses results in the shuttle tooth being temporarily advanced into engagement with the film for advancement thereof sooner by an interval equal to 1/Nth of the normal duration between successive film advancements so that the speed of advancement of the film past the projection aperture is equalized to the speed of advancement of the film past the sound pick-up head without imparting a jerky motion to a reproduced image.

14. A control as set forth in claim 13 wherein said detecting means includes a photocell disposed to receive interrupted light from the light source for generating said first train of pulses and said second pulse train generator includes a divider which divides by N the number of pulses in the first pulse train.

15. A control as set forth in claim 14 wherein said pulse deleting means includes a Nand gate having a pair of inputs and receiving the first train of pulses at one of said inputs; and
 a normally open switch which is coupled to the other of said inputs and which closes in response to said first signal so as to inhibit the passage of a pulse through said Nand gate.

16. A control as set forth in claim 15 wherein said pulse adding means includes a delay network coupled between said photocell and said divider and a second normally open switch serially coupled between said delay network and said divider, said delay network receiving the first train of pulses from said photocell and said second normally open switch being closed in response to said second signal for coupling to said divider a pulse which has been delayed by said delay network.

* * * * *